G. B. M. GRAY.
AUTOMOBILE GEAR SHIFT LOCK.
APPLICATION FILED JUNE 4, 1918.
1,367,873.
Patented Feb. 8, 1921.
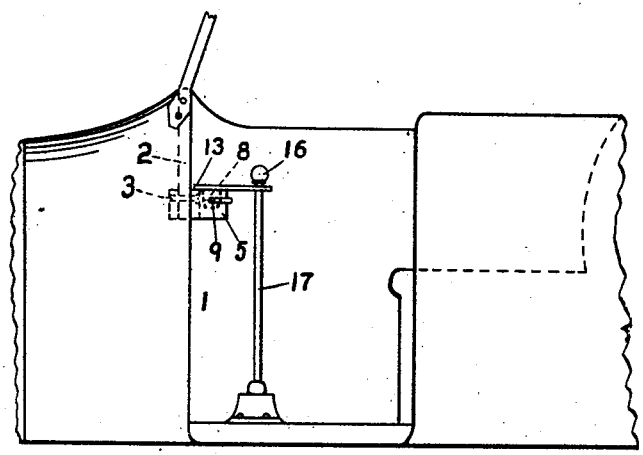
Fig. 1.
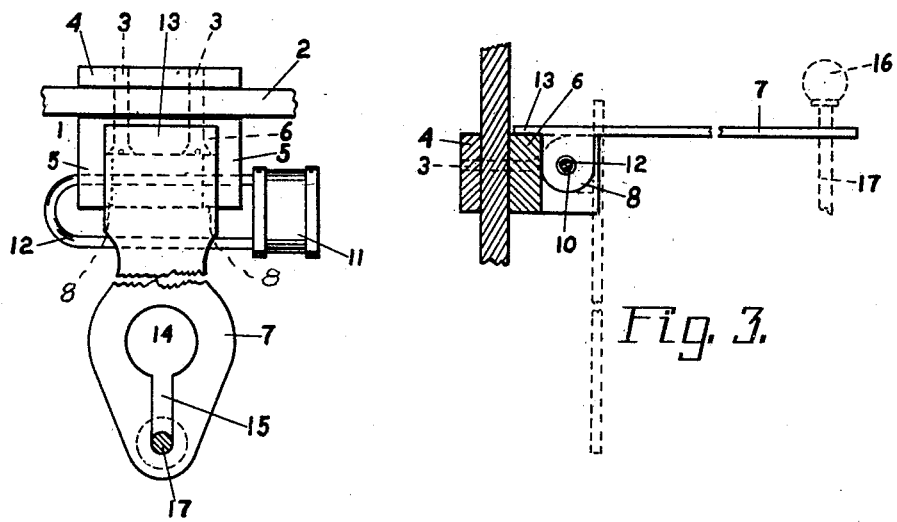
Fig. 2.
Fig. 3.
Inventor
George B. M. Gray.
By Harry C Schroeder
Attorney

UNITED STATES PATENT OFFICE.

GEORGE B. M. GRAY, OF OAKLAND, CALIFORNIA, ASSIGNOR TO ANNIE M. JOHNSON, OF OAKLAND, CALIFORNIA.

AUTOMOBILE-GEAR-SHIFT LOCK.

1,367,873.  Specification of Letters Patent.  Patented Feb. 8, 1921.

Application filed June 4, 1918. Serial No. 238,116.

*To all whom it may concern:*

Be it known that I, GEORGE B. M. GRAY, citizen of the United States, residing at Oakland, in the county of Alameda and State of California, have invented certain new and useful Improvements in Automobile-Gear-Shift Locks, of which the following is a specification.

This invention is an improved automobile lock for preventing theft of an automobile.

The invention is particularly designed to lock the gear-shift control lever and transmission gears of an automobile in neutral position.

The invention is illustrated in the accompanying drawing which forms a part of this specification and the appended claims.

Referring to the drawings:

Figure 1 is a view in side elevation of my invention applied to an automobile.

Fig. 2 is a plan view of my invention.

Fig. 3 is a vertical sectional view of my invention.

In the drawing, 1 indicates a support which is secured to the dashboard 2 of an automobile by screws 3, extending through the support, dashboard and screwing into a plate 4 on the forward face of the dashboard.

The support is formed with a pair of ears 5 and a stop 6. A locking element 7 is formed with a pair of depending ears 8 adapted to fit between the ears 5 of the support 1. The ears 5 of the support are provided with holes 9 and the ears 8 of the locking element are provided with holes 10 adapted to register with the holes 9. A lock 11 has a shackle 12 adapted to extend through the openings 9 and 10 and lock the locking element on the support. The locking element 7 is formed with a lip 13 for engaging the stop 6 to prevent upward movement of the locking end of said locking element. The locking end of the locking element is formed with an opening 14 and a slot 15 which communicates with said opening. The opening 14 permits insertion of the head 16 of gear shift lever 17 through the locking end of locking element 7, and the slot 15 receives the gear shift lever below said head, while the lever and gear shift stand in neutral.

The position of the shackle 12 when in locking position is such that it prevents access to the heads of the screws 3, thus preventing removal of the support from the dashboard.

The operation of my invention is as follows:—

The gear shift lever is first set in neutral position in which position the gears of the transmission are out of mesh. The locking element 7 is then dropped over the head 16 of the gear shift lever 17, through the opening 14. The locking element is then moved forward bringing the gear shift lever 17 below the head 16 into the rear end of slot 15. The ears 8 of the locking element are introduced between the ears 5 of the support 1 so that the openings 9 and 10 in said ears register with each other and the lip 13 rests on top of stop 6. The shackle 12 then is introduced, the holes 9 and 10 in the ears 5 and 8 of the support and locking element and the lock 11 is locked, locking the gear shift lever rigidly in neutral position.

The engagement of the lip 13 and stop 6 prevents raising of the locking element and its disengagement from the gear shift lever, while the locking element is locked.

The gear shift lever may be unlocked by unlocking lock 11, removing the shackle 12 from the ears of the support and locking element and then drawing the locking element rearwardly until the lever passes from the slot 15 into opening 14.

When the gear shift lever is unlocked the locking element 7 may be removed or hung on the support 1 by the shackle 12 and locked in such position by the lock 11.

Having described my invention I claim:

1. In combination with the gear shift lever of an automobile, a lock including a support secured to the dashboard of the automobile and formed with a pair of ears, a locking element formed with an ear to co-act with the ears of said support, said ears being provided with openings, a lock including a shackle adapted to extend through the openings in said ears to lock said locking element in engagement with said lever to lock the transmission in neutral position.

2. In combination with the gear shift lever of an automobile, a lock including a support, a locking element on said support provided with an opening to receive the head of the gear shift lever, and a slot leading from said opening to receive said lever below its head, and means for locking said locking element with the locking lever in said slot to lock the transmission in neutral position.

3. In combination with the gear shift lever of an automobile, a support formed with a pair of ears, a locking element formed with an ear for co-acting with the ears of said support, a lock including a shackle adapted to extend through said ears, said locking element being provided with an opening to receive the head of said locking lever and with a slot leading from said opening to receive said lever to hold said lever in neutral position.

4. In combination with the gear shift lever of an automobile, a support formed with a pair of ears, a locking element formed with an ear for co-acting with the ears of said support, a lock including a shackle adapted to extend through said ears, said locking element being provided with an opening to receive the head of said locking lever and with a slot leading from said opening to receive said lever to hold said lever in neutral position, a stop on said support, and a lip on said locking element for engaging said stop to prevent disengagement of said locking element from said lever.

In testimony whereof I affix my signature.

GEORGE B. M. GRAY.